Sept. 19, 1950 R. A. SANDBERG 2,522,540
STRAIGHT PULL BRAKE LEVER ASSEMBLY
Filed July 19, 1947 2 Sheets-Sheet 1
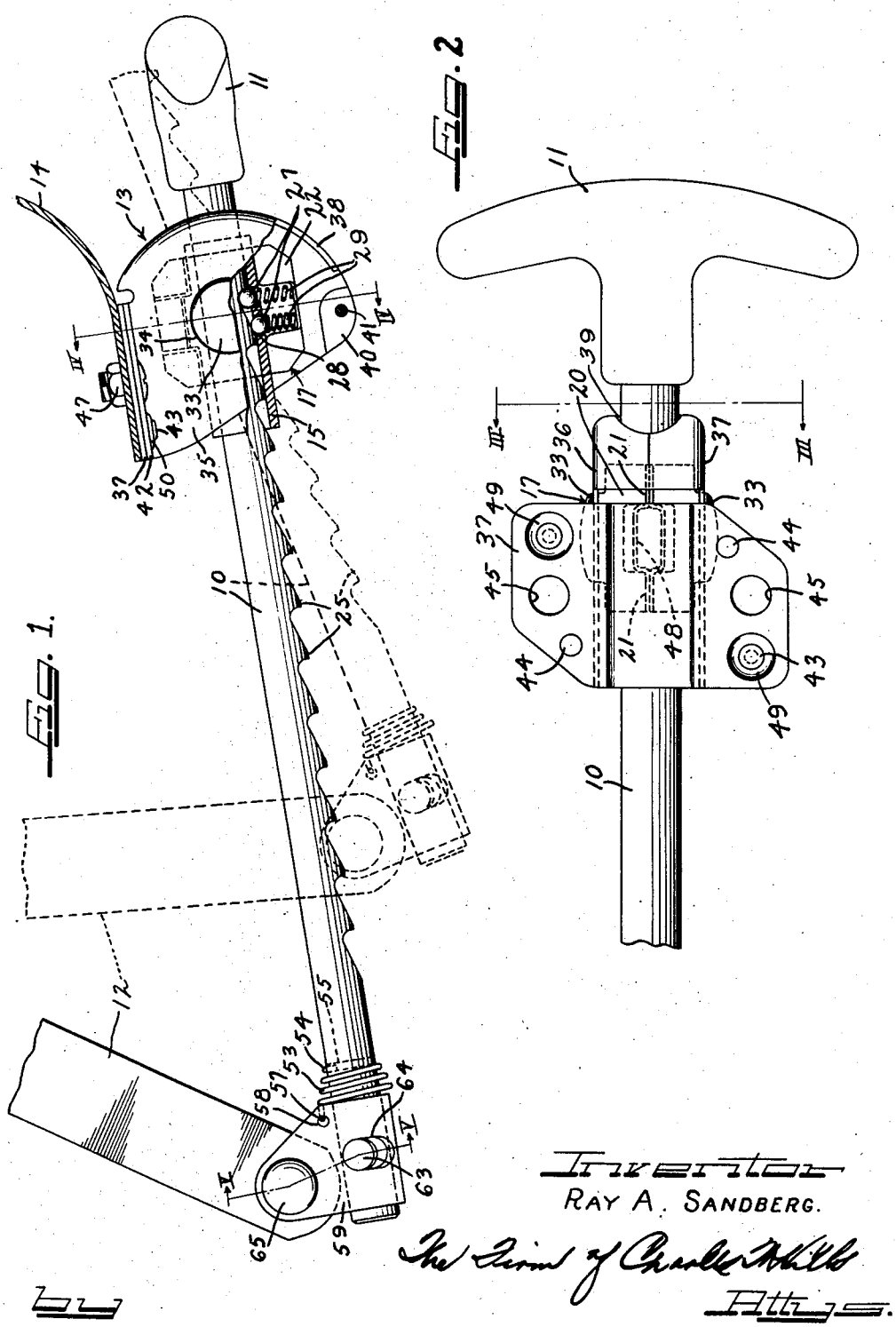
Inventor
Ray A. Sandberg.

Sept. 19, 1950  R. A. SANDBERG  2,522,540
STRAIGHT PULL BRAKE LEVER ASSEMBLY
Filed July 19, 1947  2 Sheets-Sheet 2
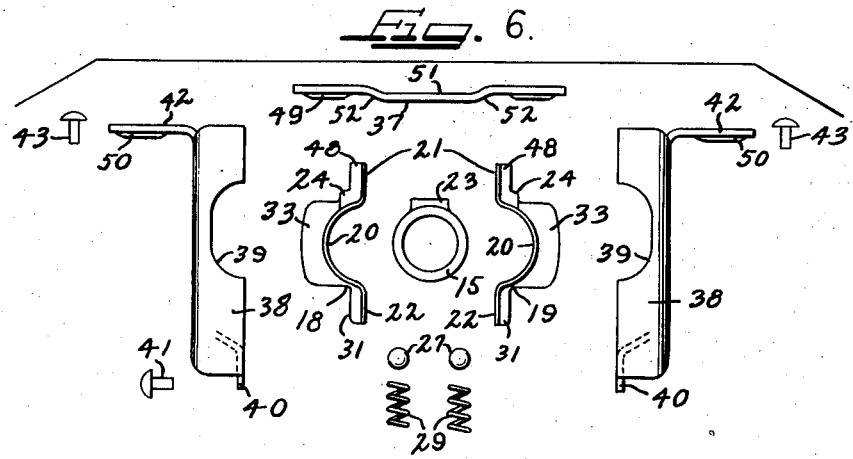
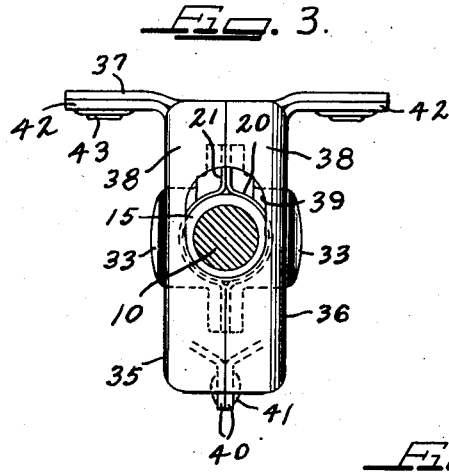
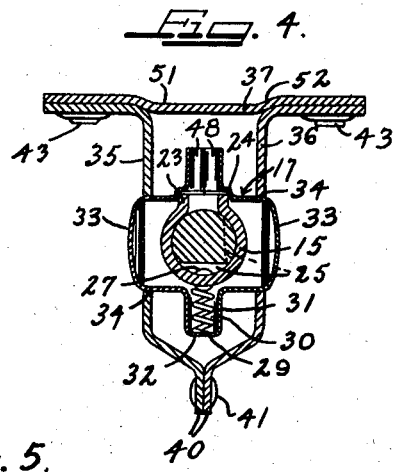
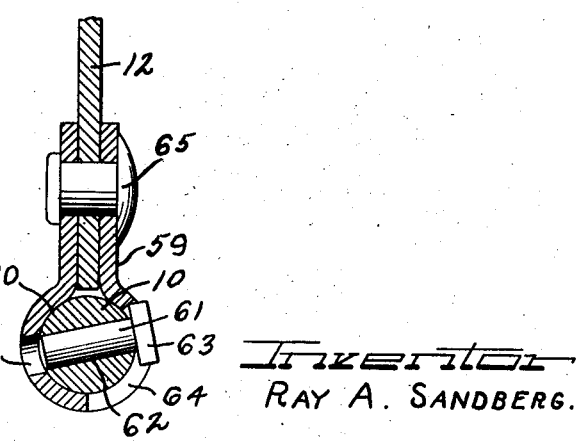
Inventor
RAY A. SANDBERG.

Patented Sept. 19, 1950

2,522,540

UNITED STATES PATENT OFFICE 2,522,540

STRAIGHT PULL BRAKE LEVER ASSEMBLY

Ray A. Sandberg, Waukegan, Ill., assignor to Houdaille-Hershey Corporation, Detroit, Mich., a corporation of Michigan Application July 19, 1947, Serial No. 762,019

11 Claims. (Cl. 74—503)

1

This invention relates to improvements in straight pull brake lever assemblies and more particularly concerns assemblies of this character which are especially adaptable for use as emergency brake levers in automobiles or the like.

An important object of the present invention is to provide an improved, simplified and efficient straight pull brake lever assembly.

Another object of the invention is to provide in a straight pull brake lever assembly improved supporting housing and pull rod guide structure.

A further object of the invention is to provide an improved pivotally related supporting housing and pull rod guide structure for a straight pull brake lever assembly.

Still another object of the invention is to provide in a straight pull brake lever assembly an improved, simplified supporting housing and pivotal guide structure adapted to be made principally from simple sheet metal stampings and adopted for high speed, economical mass production assembly.

Yet another object of the invention is to provide an improved pivoted guide structure in a straight pull brake lever assembly.

It is also an object of the invention to provide improved means for controlling operation of the pull rod of a straight pull brake lever unit.

Other objects, features and advantages of the present invention will be readily apparent from the following detailed description of a preferred embodiment thereof taken in conjunction with the accompanying drawings in which:

Figure 1 is a side elevational view, partially in sections of a straight pull brake lever assembly embodying the features of the invention;

Figure 2 is a fragmentary top plan view of the handle end portion of the assembly;

Figure 3 is a vertical sectional view taken substantially on the line III—III of Figure 2;

Figure 4 is a vertical sectional view taken substantially on the line IV—IV of Figure 1;

Figure 5 is a vertical sectional detailed view taken substantially on the line V—V of Figure 1; and Figure 6 is an exploded detail view of the components making up the assembly of the supporting housing and the pivoted guide structure and control detents of the brake lever unit.

A straight pull brake lever construction embodying the features of the present invention comprises a pull rod 10 having a manipulating handle 11 at one end and connected at the other end to a brake actuating lever 12, the pull rod being pivotally guided by a supporting structure

2

13 carried in use by a dash panel 14 of an automobile, or the like. The assembly is of such a character that in order to set the brake the handle 11 is grasped and the pull rod 10 pulled toward the person operating the same in order to pivot the lever 12 which is appropriately pivotally mounted on a part of the vehicle with which associated and is connected with the emergency brakes of the vehicle through the medium of the usual cable, in a manner which is well known and for that reason has not been illustrated.

The pull rod 10 is preferably cylindrical and is reciprocably guided by means of a guide tube 15 which forms part of the guide assembly 13. The guide tube is of an internal diameter to fit fairly closely about the pull rod 10 but permits free sliding movement of the handle therein and therethrough.

Directly supporting the guide tube 15 is a trunnion device 17 which is preferably constructed as a pair of complementary sheet metal stamping shells 18 and 19 providing opposite halves of the trunnion structure and rigidly engaging and supporting the guide tube 15.

Since the trunnion shells 18 and 19 are preferably of identical though reversely complementary form, a detailed description of one will suffice for the other and similar reference numerals are therefore applied to corresponding features thereof. Accordingly, each of the shells comprises a tube-embracing semi-cylindrical body 20 formed with laterally extending attachment flanges 21 and 22 at the upper and lower longitudinal edges thereof, respectively. In assembly with the guide tube 15, the body portions 20 are brought into embracing relation to the tube and the opposing flanges 21 and 22, respectively of the shells are secured together as by spot welding.

To retain the guide tube 15 against relative rotary and axial movement within the trunnion shell structure 17, the tube is preferably formed with an upwardly punched retaining flange structure 23 which in assembly is received within complementary keeper socket offsets 24 in the respective body portions 20 adjacent to the bases of the upper attachment flanges 21 (Fig. 4).

Means for retaining the pull rod 10 in any of a plurality of incremental brake take up and setting positions comprises a series of forwardly shouldered ratchet teeth progressively and selectively engageable with detent balls 27 carried in ball apertures 28 formed in predetermined spaced relation in the underside of the guide tube 15. Coiled biasing springs 29 are seated in a spring chamber 30 formed in the trunnion casing 17. By preference the spring chamber 30 is formed by appropriate complementary offset 31 formed in the lower engagement flanges 22 and having right angular edgewise abutting lower closure flange portions 32. Within the spring chamber 30, the springs 29 are held under at least slight compression so that they are constantly biased toward engagement with the ratchet teeth 25. Thus, when the rod 10 is pulled rearwardly through the guide tube 15, the detent balls 27 successively engage with the detent teeth and hold the rod against retraction. The balls 27 are spaced apart half the draw length of each of ratchet teeth 25 whereby to double the brake take up increments provided by the ratchet.

Since in the operation of the brake lever, the pull rod 10 must rock as well move reciprocably, substantially as indicated in dash outline in Figure 1, a pivotal mounting is provided for the guide structure for the pull rod. To this end, each of the trunnion shell members 18 and 19 is provided with an integral outwardly protruding intermediately formed trunnion boss 33 which protrudes sufficiently beyond the semi-cylindrical body 20 to be freely rotatably received in journal apertures 34 provided in journal plates 35 and 36 forming, together with a top plate 37 a supporting housing for the pull rod guide and pivot structure.

The journal and housing plates 35 and 36 are preferably formed substantially identically but in reverse order so as to be complementary for assembly into the completed housing. Therefore, each of the journal plates is preferably formed as a sheet metal shell which may be stamped to form and includes integral right angularly extending and arcuately shaped rear edge reenforcing and spacer flange 38 having a pull rod clearance cut out 39 and a lower marginal abutment inset 40. In assembly the edges of the respective flanges 38 abut and the abutment flanges 40 lie in face to face abutment and maintain a proper spacing of the journal plates 35 and 36, the rod clearance cut outs 39 registering and forming an elongated clearance aperture for accommodating rocking movement of the pull rod 10. Means such as a rivet 41 extending through appropriate aligned apertures in the abutment inset portions 40 secures the journal plates or shells together.

At their upper edges the journal plates 35 and 36 are formed with respective laterally extending attachment flanges 42 which are appropriately apertured complementary to the plate 37 to be secured to the latter by such means as respective rivets 43. For additional rigidity, the flanges 42 and the plate 37 may be formed with registering dimple and aperture structure 44. That is, a dimple punched in one of the structures fits in an aperture providing a socket in the other of the structures. In addition, the flanges 42 and the plate 37 are formed with aligned apertures 45 to accommodate respective attachment bolts 47 by which the housing assembly is secured to the underslung flange portion of the dash panel 14.

Having reference to Figure 6, it will be apparent that all of the several parts forming components of the pull rod supporting and guiding assembly are so constructed and related as to lend themselves readily to low cost, high speed mass production assembly methods. First the trunnion shells 18 and 19 are assembled with the guide tube 15. Thereafter the journal shell plates 35 and 36 are assembled with the trunnion structure 17 supported therebetween, the top plate 37 is assembled with the flanges 42 and the housing securely riveted together with the rivets 41 and 43. Either before or after assembly of the trunnion structure 17 with the housing, the biasing springs 29 and the detent balls 27 are assembled in the unit, the opening provided by the retaining flange structure 23 in the tube 15 and chimney-like offsets 48 in the flanges 21 above the retaining offsets 24 providing a convenient passage for access to the detent apertures 28 for assembly purposes. Any suitable means (not shown) may be used for holding the detent balls 27 retracted until the pull rod 10 is inserted into the tube 15.

In order to facilitate quick assembly, registering means such as offsets 49 about the rivet holes in the top plate 37 may be provided for registering with complementary offsets 50 in the flanges 42. In addition, a central longitudinal offset 51 may be formed in the plate 37 providing centering and reenforcement shoulders 52 engageable with the shoulders provided at the juncture of the flanges 42 with the respective journal plates 35 and 36.

To set the brake, of course, the handle 11 is grasped and pulled to draw the pull rod 10 through the guide tube 15, and the detent balls 27 will act to hold the pull rod in any preferred brake setting position.

To release the brake all that need be done is to turn the handle 11 as permitted by its sliding engagement within the guide tube 15 until the ratchet teeth 25 are clear of the ball detents 27 whereupon the strain of the brake cable will pull the pull rod forwardly to released position.

Upon release of the handle 11 following release of the brake, the pull rod 10 is promptly returned to its initial position wherein the ratchet teeth 25 register operatively with the ball detents 27. Means for effecting this may comprise a tensioning spring 53 which may be in the form of a spiral spring maintained under torsional load by the engagement of one terminal 54 in an appropriate aperture 55 in the draw rod 10 and the engagement of the opposite terminal identified at 57 in an appropriate aperture 58 formed in a clevis member 59 by which the forward end portion of the draw rod 10 is pivotally connected to the lever 12.

As best seen in Figures 1 and 5, the clevis 59 is preferably formed from sheet metal bent to appropriate form providing an eye 60 within which the end portion of the draw rod 10 is received rotatably.

A coupling permitting limited rotary movement and no relative axial movement between the draw rod 10 and the clevis 59 is afforded by means of a pin 61 which is driven through a transverse bore 62 in the end portion of the draw rod and has a head 63 which is received in an appropriate chordal slot 64 in the wall of the eye 60 of the clevis. Thereby, the clevis 59 is held for movement with the draw rod 10 in an axial direction but the rod is rotatable within the limits permitted by the slot 64 and which limits are such as to permit approximately 90° rotation of the rod in one direction to effect release of the ratchet teeth 25 from the ball detents 27 as indicated in dash outline in Figure 4. The return spring 53 is so loaded that it normally maintains the rod 10 in its ratcheting position but will yield in response to manual turning effort on the rod for brake release purposes.

Pivotal connection of the clevis 59 and the lever 12 is effected in a suitable manner as for example by means of a rivet 65.

In order to permit ready uncoupling of the clevis 59 from the draw rod 10 when necessary, an access or knockout aperture 67 is formed in the wall of the eye 60 for registration with the end of the pin 61 so that the latter can be driven from its press-fitted assembled relationship with the draw rod 10.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a brake lever assembly, a guide tube for a ratchet rod, a trunnion structure comprising a pair of trunnion shells secured together about said tube, and a supporting journal structure comprising a pair of shell members secured together about said trunnion structure and affording bearing for the trunnion shells.

2. In combination in a brake lever assembly, a reciprocal and rotary rod, a guide tube within which said rod is slidably supported, a trunnion structure comprising a pair of sheet metal shells secured together in supporting relation about said tube and having integral oppositely extending coaxial trunnions, and a journal housing having journals within which said trunnions are engaged and supporting said trunnion structure.

3. In combination in a brake lever assembly, a rod guiding structure having trunnions thereon, a journal housing for said guide structure comprising a pair of matching journal plates each of which has an angularly turned flange along one edge engageable in abutment with the flange of the other plate to maintain the plates in spaced relation, an inset engagement pad area on each of the plates abutting the pad on the other plate, means securing said pads together, an outwardly extending flange at the top of each of the plates, and a top plate secured between said journal plates and to said top flanges.

4. In combination in a brake lever assembly, a trunnion structure comprising a guide tube, and a pair of trunnion plates secured about said tube, said tube and said trunnion plates having interengaging means for holding the tube against movement relative to the trunnion plates.

5. In a brake lever construction, a trunnion shell having a semi-cylindrical body adapted to receive a guide tube cradled therein, flanges extending from said body for attachment to a counterpart trunnion shell and an integral trunnion boss projecting beyond the periphery at an intermediate point on the body, one of said flanges being intermediately offset to provide one-half of a detent chamber.

6. In a brake lever construction, a trunnion shell having a semi-cylindrical body adapted to receive a guide tube cradled therein, flanges extending from said body for attachment to a counterpart trunnion shell and an integral trunnion boss projecting beyond the periphery at an intermediate point on the body, one of said flanges having an interlock socket keeper recess offset therein for engagement with a retaining flange on the tube.

7. In a brake lever construction, a trunnion shell comprising a semi-cylindrical body having an intermediate trunnion boss protruding beyond the periphery thereof, flanges extending from opposite sides of the body, one of said flanges having a detent chamber recess offset therein, the opposite flange having a chimney-like offset intermediately therein providing for access toward said chamber offset.

8. In combination in a brake lever assembly, a guide tube for slidably guiding a brake actuating rod member, a pair of trunnion plates secured about said tube, and means for holding the tube against movement relative to the trunnion plates comprising a portion projecting from the periphery of the tube and a socket formation in the trunnion plates within which said projection is engaged.

9. In a brake lever assembly of the character described, a ratchet rod guide tube, a pair of trunnion shells of oppositely complementary construction each comprising a semi-cylindrical body embracingly assembled on the tube and having an outwardly projecting intermediately formed trunnion boss, flanges extending from the respective opposite sides of the body of each of said shells and secured to the corresponding flanges of the companion shell, the flanges on one side of the trunnion shell assembly being relatively offset to provide a detent chamber recess therebetween opening toward the tube, the flanges at the opposite side of the shell assembly having a chimney-like offset cooperative structure intermediately therein opening from the tube outwardly, said tube being apertured therethrough in the portions thereof registering with said chamber and chimney-like offset structure for access through said chimney-like offset structure transversely through the tube into said chamber.

10. As an article of manufacture, a housing structure adapted for supporting an operating rod guiding and control assembly for a straight pull brake lever comprising a pair of complementary shell members each of which comprises a side wall panel having at its top margin a laterally outwardly extending flange for attachment to a support and at its lower margin an inset spacer and connecting pad, a spacer flange along the rear margin of each of said shells projecting opposite to its top flange, said rear spacer flanges engaging in edge-to-edge abutment and said inset pads engaging in face-to-face abutment and being secured together, said rear spacer flanges and said attachment pads maintaining said side wall panels in spaced relation to define a rod-guiding mechanism chamber, the front edges of the shells being in spaced relation to define a forward opening from said chamber.

11. As an article of manufacture, a housing structure adapted for supporting an operating rod guiding and control assembly for a straight pull brake lever, a pair of complementary shell members each of which comprises a side wall panel having at its upper margin a laterally extending attachment flange and at its lower margin an inset spacer and connecting pad, a spacer flange along the rear margin of each of said shells projecting opposite to said top flange, said rear spacer flanges engaging into edge-to-edge abutment and said inset pads engaging in face-to-face abutment and being secured together, said rear spacer flanges and said attachment pads maintaining said side wall panels in spaced relation to define a rod-guiding mechanism chamber, the front edges of the shells being in spaced relation to define a forward opening from said chamber, and a rigidifying and connecting plate permanently secured across and on top of said upper marginal flanges, said upper marginal flanges and said plate being apertured in registration for passage of attachment bolts for securing the assembly to a supporting structure.

RAY A. SANDBERG.

REFERENCES CITED

The following references are of record in the file of this patent:

UNITED STATES PATENTS

| Number | Name | Date |
|---|---|---|
| 457,843 | Sawyer | Aug. 18, 1891 |
| 991,184 | Troendle | May 2, 1911 |
| 1,380,659 | Layman | June 7, 1921 |
| 1,449,148 | Gehrig | Mar. 20, 1923 |
| 1,997,450 | Mitchell | Oct. 16, 1934 |
| 2,005,948 | Mitchell | June 25, 1935 |
| 2,139,555 | McKercher | Dec. 6, 1938 |
| 2,274,133 | Fergueson | Feb. 24, 1942 |
| 2,295,792 | Jandus | Sept. 15, 1942 |
| 2,304,356 | Heller | Dec. 8, 1942 |
| 2,308,898 | Skarien | Jan. 19, 1943 |
| 2,329,722 | Jandus | Sept. 21, 1943 |
| 2,377,691 | Jandus | June 5, 1945 |
| 2,429,224 | Fergueson | Oct. 21, 1947 |